(12) United States Patent
Zamer

(10) Patent No.: US 9,818,144 B2
(45) Date of Patent: Nov. 14, 2017

(54) VISUAL PRODUCT FEEDBACK

(71) Applicant: eBay Inc., San Jose, CA (US)

(72) Inventor: Kamal Zamer, Austin, TX (US)

(73) Assignee: EBAY INC., San Jose, CA (US)

( * ) Notice: Subject to any disclaimer, the term of this patent is extended or adjusted under 35 U.S.C. 154(b) by 667 days.

(21) Appl. No.: 13/859,253

(22) Filed: Apr. 9, 2013

(65) Prior Publication Data

US 2014/0304105 A1     Oct. 9, 2014

(51) Int. Cl.
G06Q 30/00     (2012.01)
G06Q 30/06     (2012.01)

(52) U.S. Cl.
CPC ................. G06Q 30/0631 (2013.01)

(58) Field of Classification Search
CPC ............... G06C 30/06; G06C 30/0631
See application file for complete search history.

(56) References Cited

U.S. PATENT DOCUMENTS

| | | | |
|---|---|---|---|
| 6,283,914 B1 | 9/2001 | Mansfield et al. | |
| 8,464,954 B2* | 6/2013 | Chiou ................ | G06K 7/10722 235/462.01 |
| 2007/0135690 A1* | 6/2007 | Nicholl ................ | A61B 5/0002 600/301 |
| 2007/0179359 A1* | 8/2007 | Goodwin ................ | A63B 71/00 600/300 |
| 2009/0099873 A1* | 4/2009 | Kurple ................... | G06Q 50/24 705/3 |
| 2012/0094258 A1 | 4/2012 | Langheier et al. | |
| 2013/0032634 A1 | 2/2013 | McKirdy | |
| 2013/0048723 A1 | 2/2013 | King | |
| 2013/0179455 A1* | 7/2013 | Herger ................ | G06Q 10/101 707/749 |

FOREIGN PATENT DOCUMENTS

| | | | |
|---|---|---|---|
| EP | 0997858 | A2 | 5/2000 |
| EP | 1278145 | A1 | 2/2003 |
| EP | 1363225 | A2 | 11/2003 |
| EP | 1283689 | A4 | 3/2005 |
| EP | 1284642 | A4 | 3/2005 |
| EP | 1136035 | B1 | 5/2006 |
| EP | 2569717 | A1 | 3/2013 |

OTHER PUBLICATIONS

Deven Hopp "7 fitness and diet apps to help make you healthier", Chicago Tribune (Online) Chicago: Tribune Interactive, LLC. (Apr. 17, 2017).*

* cited by examiner

*Primary Examiner* — Naeem Haq
(74) *Attorney, Agent, or Firm* — Shook, Hardy & Bacon L.L.P.

(57) ABSTRACT

According to various embodiments, user goal information describing a user goal is accessed. The user goal may be assigned a target date, and the user goal may be a health-related goal or a finance-related goal. It is determined whether the purchase or consumption of a given product item either contributes or does not contribute to achieving the user goal. Thereafter, visual product feedback information indicating whether procurement of the product item contributes or does not contribute to achieving the user goal is displayed.

14 Claims, 19 Drawing Sheets

Recognized:

Bowl of Salad

Goal: lose 10 pounds by Christmas

Recognized:

Slice of Supreme Pizza

Looks like you're on vacation!

VISUAL PRODUCT FEEDBACK

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software and data as described below and in the drawings that form a part of this document: Copyright eBay, Inc. 2013, All Rights Reserved.

TECHNICAL FIELD

The present application relates generally to the technical field of electronic data and, in one specific example, to systems and methods for providing visual product feedback.

BACKGROUND

Many users have various goals they would like to achieve, such as health-related goals, weight loss goals, financial goals, and other goals. These goals often intersect with the purchase and consumption of product items. For example, many health-related goals often pertain to the types of food items that users desire to purchase and consume. As another example, many financial-related goals often pertain to user spending on purchases of various product items and services.

BRIEF DESCRIPTION OF THE DRAWINGS

Some embodiments are illustrated by way of example and not limitation in the figures of the accompanying drawings in which.

DETAILED DESCRIPTION

Example methods and systems for providing visual product feedback are described. In the following description, for purposes of explanation, numerous specific details are set forth in order to provide a thorough understanding of example embodiments. It will be evident, however, to one skilled in the art that the present invention may be practiced without these specific details.

According to various exemplary embodiments, when a user is considering purchasing or consuming a product item, a visual product feedback system provides the user with visual product feedback information indicating whether the product item is suitable for the user and whether the product item can help the user achieve a predefined personal goal. For example, a visual product feedback system may allow the user to specify various goals, such as health-related goals (e.g., a weight-loss goal, a caloric intake goal, a healthy lifestyle goal, a goal to eat fresher foods, etc.), or finance-related goals (e.g., a goal to save money, a budget, a spending limit, etc.). Accordingly, when the user scans a barcode for a product item or takes a photograph of the product item with their smartphone, the visual product feedback system may provide the user with visual product feedback indicating whether the product item is suitable for the user and their goals. As one non-limiting example, the visual product feedback is provided in the form of an icon of a face having various expressions ranging from "smiling" to "ambivalent" to "sad", and so on, based on a determination of a level of suitability of the product in view of the goals of the user.

Figure 1:
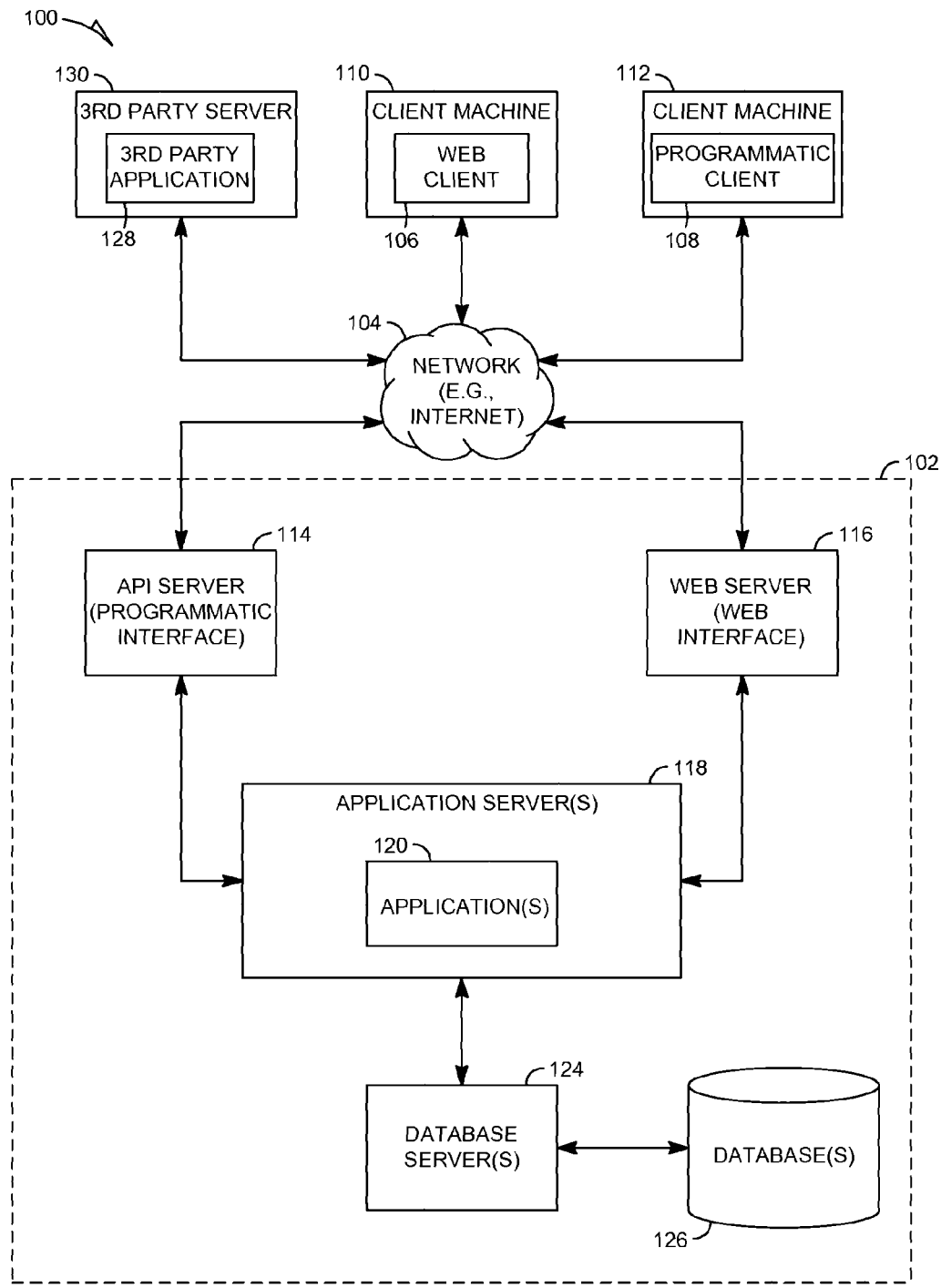
FIG. 1 is a network diagram depicting a client-server system, within which one example embodiment may be deployed.

FIG. 1 is a network diagram depicting a client-server system 100, within which one example embodiment may be deployed. A networked system 102 provides server-side functionality via a network 104 (e.g., the Internet or Wide Area Network (WAN)) to one or more clients. FIG. 1 illustrates, for example, a web client 106 (e.g., a browser), and a programmatic client 108 executing on respective client machines 110 and 112.

An Application Program Interface (API) server 114 and a web server 116 are coupled to, and provide programmatic and web interfaces respectively to, one or more application servers 118. The application servers 118 host one or more applications 120. The application servers 118 are, in turn, shown to be coupled to one or more databases servers 124 that facilitate access to one or more databases 126. According to various exemplary embodiments, the applications 120 may correspond to one or more of the modules of the system 200 illustrated in FIG. 2. While the applications 120 are shown in FIG. 1 to form part of the networked system 102, it will be appreciated that, in alternative embodiments, the applications 120 may form part of a service that is separate and distinct from the networked system 102.

Further, while the system 100 shown in FIG. 1 employs a client-server architecture, the present invention is of course not limited to such an architecture, and could equally well find application in a distributed, or peer-to-peer, architecture system, for example. The various applications 120 could also be implemented as standalone software programs, which do not necessarily have networking capabilities.

The web client 106 accesses the various applications 120 via the web interface supported by the web server 116. Similarly, the programmatic client 108 accesses the various services and functions provided by the applications 120 via the programmatic interface provided by the API server 114.

FIG. 1 also illustrates a third party application 128, executing on a third party server machine 130, as having programmatic access to the networked system 102 via the programmatic interface provided by the API server 114. For example, the third party application 128 may, utilizing information retrieved from the networked system 102, support one or more features or functions on a website hosted by the third party. The third party website may, for example, provide one or more functions that are supported by the relevant applications of the networked system 102.

Figure 2:
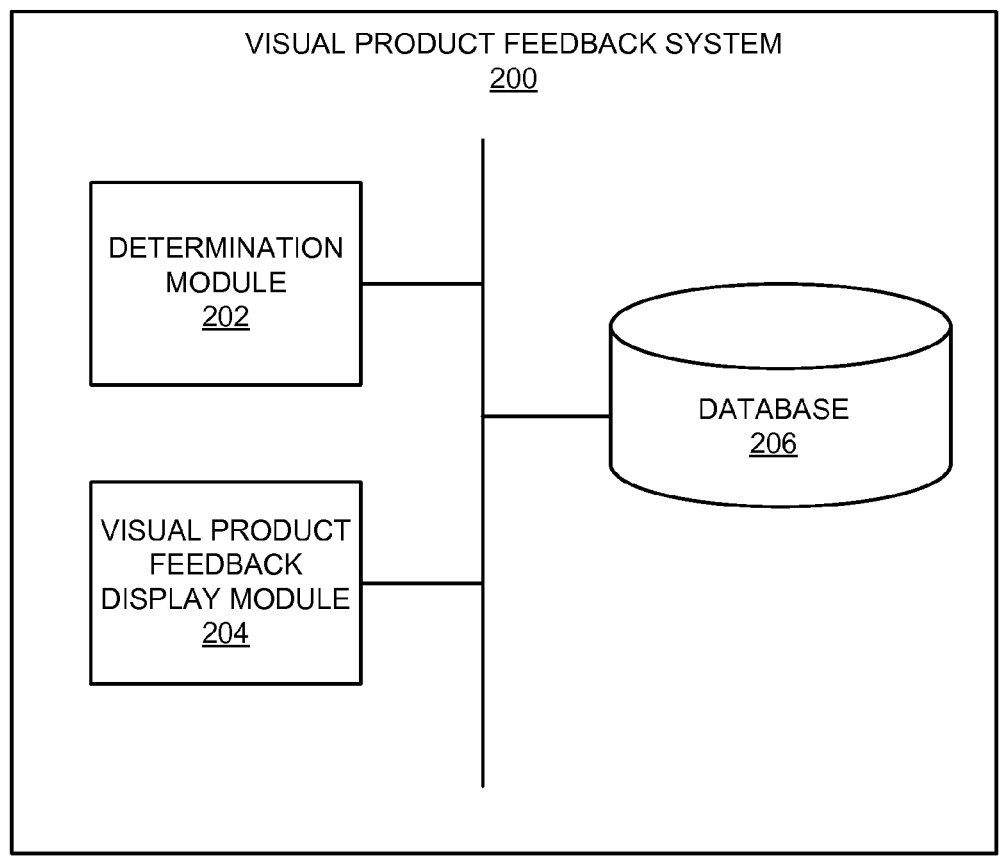
FIG. 2 is a block diagram of an example system, according to various embodiments.

Turning now to FIG. 2, a visual product feedback system 200 includes a determination module 202, a visual product feedback display module 204, and a database 206. The modules of the visual product feedback system 200 may be implemented on or executed by a single device such as a visual product feedback device, or on separate devices interconnected via a network. The aforementioned visual product feedback device may be, for example, one of the client machines (e.g. 110, 112) or application server(s) 118 illustrated in FIG. 1.

Figure 3:
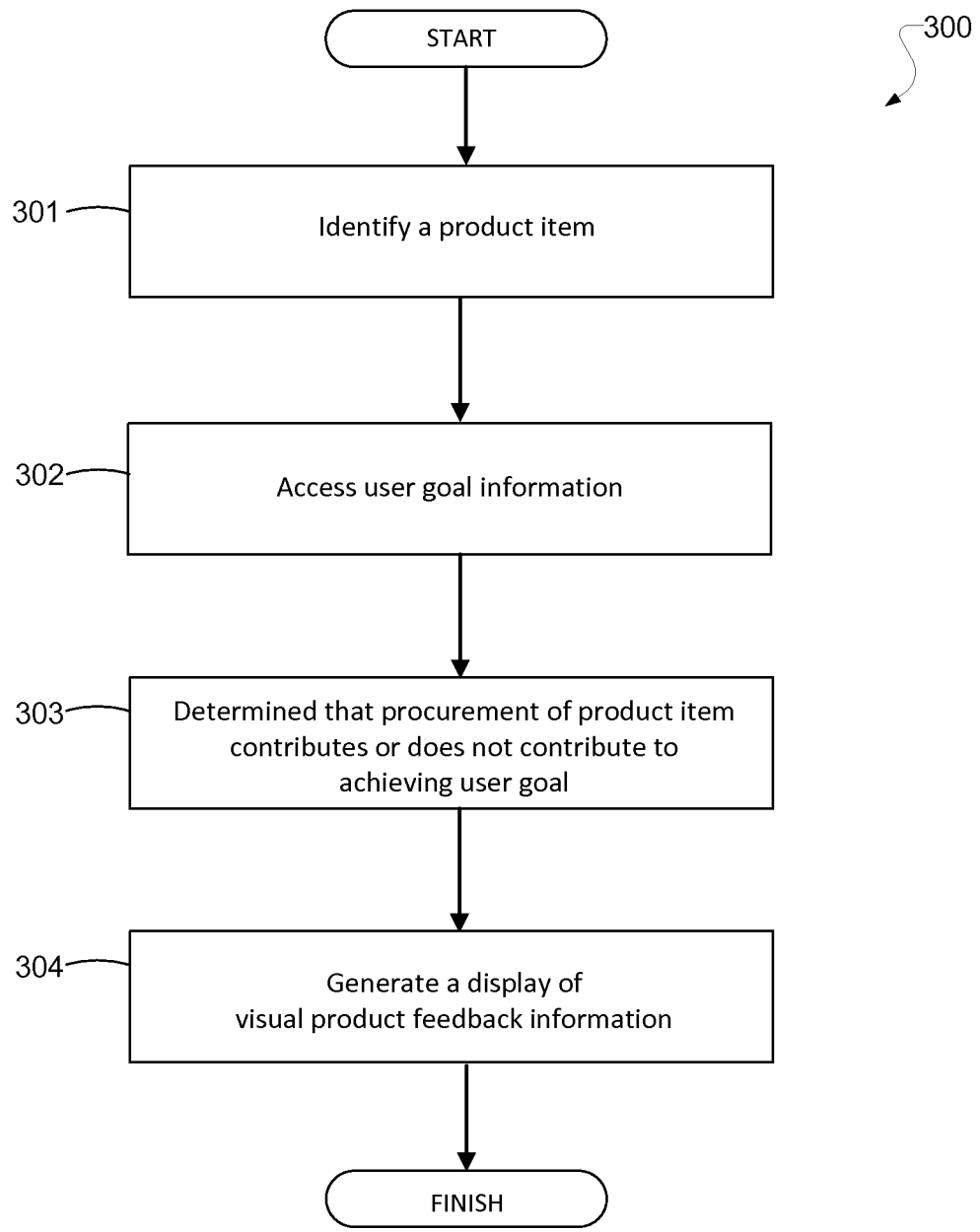
FIG. 3 is a flowchart illustrating an example method, according to various embodiments.

FIG. 3 is a flowchart illustrating an example method 300, according to various embodiments. The method 300 may be performed at least in part by, for example, the visual product feedback system 200 illustrated in FIG. 2 (or an apparatus having similar modules, such as client machines 110 and 112 or application server 112 illustrated in FIG. 1). The operations 301-304 in the method 300 will now be described briefly. In 301, the determination module 202 identifies a product item being viewed by a user. In 302, the determination module 202 accesses user goal information describing a user goal having a target date. The target date of the user goal may be the date when a user plans to complete or achieve the user goal. According to various exemplary embodiments, the user goal may be a health-related goal or a finance-related goal. Non-limiting examples of user goals having target dates include "lose 10 pounds by Christmas" and "save $5000 by spring break vacation". In 303, the determination module 202 determines whether procurement (e.g., purchase and/or consumption) of the product item identified in 301 either contributes or does not contribute to achieving the user goal. Finally, in 304, the visual product feedback display module 204 generates a display, via a user interface in a mobile device of the user, of visual product feedback information. Such visual product feedback information may indicate whether procurement of the product item contributes or does not contribute to the user achieving their goal. Each of the aforementioned operations 301-304, and each of the aforementioned modules of the visual product feedback system 200, will now be described in greater detail.

Referring back to FIG. 3, in 301, the determination module 202 identifies a product item being viewed by a user. The product item referred to herein is not limited, and may be any type of item, including food items, products for sale in a business or retail store, exercise equipment, and so on. According to an exemplary embodiment, the determination module 202 may determine that a user is viewing a product item when the user views a webpage describing or displaying the product item. For example, the determination module 202 may determine that a web browser application being executed on a device (e.g., a computer, a laptop or notebook, a smartphone, a tablet computing device, etc.) of the user is displaying a webpage describing or displaying a particular product item.

According to another exemplary embodiment, the determination module 202 may determine that a user is viewing a product item if the user utilizes a camera of their mobile device (e.g., a cell phone, smartphone, tablet computing device, etc.) to scan a barcode (e.g., standard two-dimensional barcode, quick response (QR) code, etc.) affixed to the product item. The determination module 202 may then decode identification information encoded into the barcode that was scanned, and cross check this identification information with a database listing identification information for various product items, in order to identify the scanned product item. The aforementioned database may correspond to the database 206 illustrated in FIG. 2, or a remote database or repository accessed via a network (e.g., the Internet). Thus, in 301, the determination module 202 may perform a barcode scanning operation on a camera-generated image of a barcode attached to the product item, as understood by those skilled in the art.

According to another exemplary embodiment, the determination module 202 may determine that a user is viewing a product item if the user utilizes the camera of their mobile device to capture an image of the product item. The determination module 202 may perform an image recognition program in order to recognize and identify the product item. For example, the determination module 202 may compare the image capture of the product item against a database including sample images of various product items, in order to identify the product item, as understood by those skilled in the art. The image capture and recognition process performed by the determination module 202 may recognize the quantity of product items scanned. For example, the determination module 202 may identify that the user has scanned four cookies, two chocolate bars, and so on. Thus, in 301, the determination module 202 may perform an image recognition operation on a camera-generated image of the product item, as understood by those skilled in the art.

In 302 in FIG. 3, the determination module 202 accesses user goal information describing a user goal. The user goal information may be stored at, for example, the database 206 illustrated in FIG. 2, or on a remote database or storage repository (e.g., a server) that is accessible by the visual product feedback system 200 via a network (e.g., the Internet). According to various exemplary embodiments described herein, a user goal described in the user goal information is not limited and may correspond to any type of goal that a user desires to achieve. According to an exemplary embodiment, the user goal may be a health-related goal, such as a goal to lose weight, a goal to eat healthier, a goal to increase or limit intake of particular types or sources of foods (e.g., fresh foods, vegetables, fruit, lean foods, junk food, fast food, oily food, greasy food, fatty food, etc.), a goal to exercise more, and so on. According to another exemplary embodiment, the user goal may be a finance-related goal, such as a goal to save a particular amount of money, a daily or weekly spending limit, a daily or weekly budget, and so on.

According to various exemplary embodiments, the user goal may be assigned a target date. The target date may be expressed as a time, a date, a length of time, a holiday, vacation, a special occasion, an upcoming event stored on a calendar of the user, an anticipated life event, and so on. Examples of a health-related goals that are assigned a target date include goals to "lose 10 pounds by Christmas", "reduce my daily caloric intake to 2000 calories a day by one month", "lose some pounds before my friend's wedding next spring", fit into my special dress for my high school reunion", and so on. Examples of finance-related goals that are assigned a target date include goals to "save $2000 for spring break vacation", "save $50,000 for my daughter's college costs", "spend no more than $500 a week", and so on.

As described in more detail below in conjunction with various embodiments, the user may enter these goals into the visual product feedback system 200, and the determination module 202 may generate user goal information indicating specific action items or recommendations to help the user to achieve these goals. For example, for a health-related goal to "lose 10 pounds by Christmas", the determination module 202 may calculate that the user should reduce their daily caloric intake to 2000 calories a day and reduce their daily fat intake to 20 g per day, between now and Christmas. As another example, for a finance-related goal to "save $2000 for spring break vacation", the determination module 202 may calculate that the user should spend no more than $500 a week between now and spring break.

In 303 in FIG. 3, the determination module 202 determines whether procurement (e.g., purchase or consumption) of the product item identified in operation 301 contributes to achieving the user goal. In one of the examples above, for a health-related goal to "lose 10 pounds by Christmas", the determination module 202 may calculate that the user should reduce their daily caloric intake to 2000 calories a day and reduce their daily fat intake to 20 grams per day between now and Christmas. Thus, if the product item identified in 301 is a pizza, the determination module 202 may access a database (e.g., database 206, or a remote storage repository accessible via a network) storing nutritional information for various foods, in order to determine the nutritional value (e.g., calories, fat, etc.) of pizza. Moreover, the determination module 202 may also determine how many calories the user has already consumed today. For example, the determination module 202 may access a database (e.g., database 206, or a remote storage repository accessible via a network) containing electronic financial account information of the user (e.g., credit card accounts, checking accounts, PayPal account, other financial accounts, etc.) in order to determine other foods that the user has purchased today. As another example, the determination module 202 may access a history (e.g., in database 206) of other food items that have been scanned by the visual product feedback system 200 today. According to an exemplary embodiment, the determination module 202 may also determine how many calories the user has burned through activity/exercise today. For example, the determination module 202 may access electronic information from a pedometer or exercise machine (e.g., cycling machines, treadmill, elliptical machine, etc.) in order to determine how many calories the user has burned.

As another example, the determination module 202 may use geo-location information of the mobile device in order to determine if the user has walked between certain locations, and to extrapolate the number of steps walked. Based on this information, the determination module 202 may determine that consumption of the pizza will cause the user to exceed their daily intake limit, thus making it difficult for the user to achieve their goal of "lose 10 pounds by Christmas". On the other hand, if the item scanned by the user was a bowl of salad, for example, then the determination module 202 may determine that consumption of the bowl of salad will allow the user to stay within their daily intake limits, and therefore help contribute to the user achieving their goal of "lose 10 pounds by Christmas". Thus, in 303, the determination module 202 may compare a nutritional value of the product item with a nutritional consumption limit included in the user goal information.

In another example above, for a finance-related goal to "save $2000 for spring break vacation", the determination module 202 may calculate that the user should spend no more than $500 a week between now and spring break. Thus, if the product item identified in 301 is an expensive Rolex watch, the determination module 202 may access a database listing pricing information for various products, in order to determine the price of the Rolex watch. Moreover, the determination module 202 may also determine how much money the user has already spent today. For example, the determination module 202 may access electronic financial account information of the user (e.g., credit card accounts, checking accounts, PayPal account, other financial accounts, etc.) in order to determine other purchases the user has made today. Based on this information, the determination module 202 may determine that purchasing the Rolex watch will cause the user to exceed their daily spending limit, thus making it difficult for the user to achieve their goal of "save $2000 for spring break vacation". On the other hand, if the item scanned by the user was a cheap watch, for example, then the determination module 202 may determine that purchase of the cheap watch will allow the user to stay within the daily spending limits, and therefore contribute to the user achieving their goal of "save $2000 for spring break vacation". Thus, in 303, the determination module 202 may compare a price value of the product item with a spending limit included in the user goal information.

In 304 in FIG. 3, the visual product feedback display module 204 displays visual product feedback information in a mobile device of the user, where the visual product feedback indication indicates whether procurement of the product item scanned in 301 contributes—or does not contribute—to achieving a user goal. The visual product feedback information may include various types of indicia that may be personalized for each user. For example, the visual product feedback information may correspond to icons of faces having various expressions, such as a happy expression (e.g., indicating that this product will help the user achieve their goal), an ambivalent expression (e.g., indicating that this product will have a neutral effect on helping the user achieve their goal), a sad expression (e.g., indicating that this product will not help or will prevent the user achieve their goal), a distressed expression (e.g., indicating that consumption of this product is dangerous), and so on. Other examples of visual product feedback information may include hand signals (e.g., thumbs-up, thumbs down, etc.), ticks/checkmarks or crosses, the words "good" or "bad", an alpha-numeric character such as "A", "Z", "10" or "0", a particular number of stars, and so on.

Figure 4:
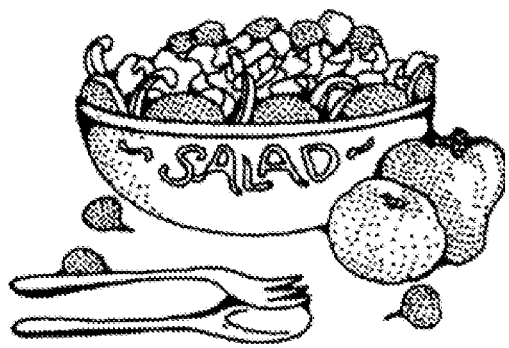
FIG. 4 illustrates an exemplary portion of a user interface displaying visual product feedback information, according to various embodiments.
Figure 4:
Figure 5:
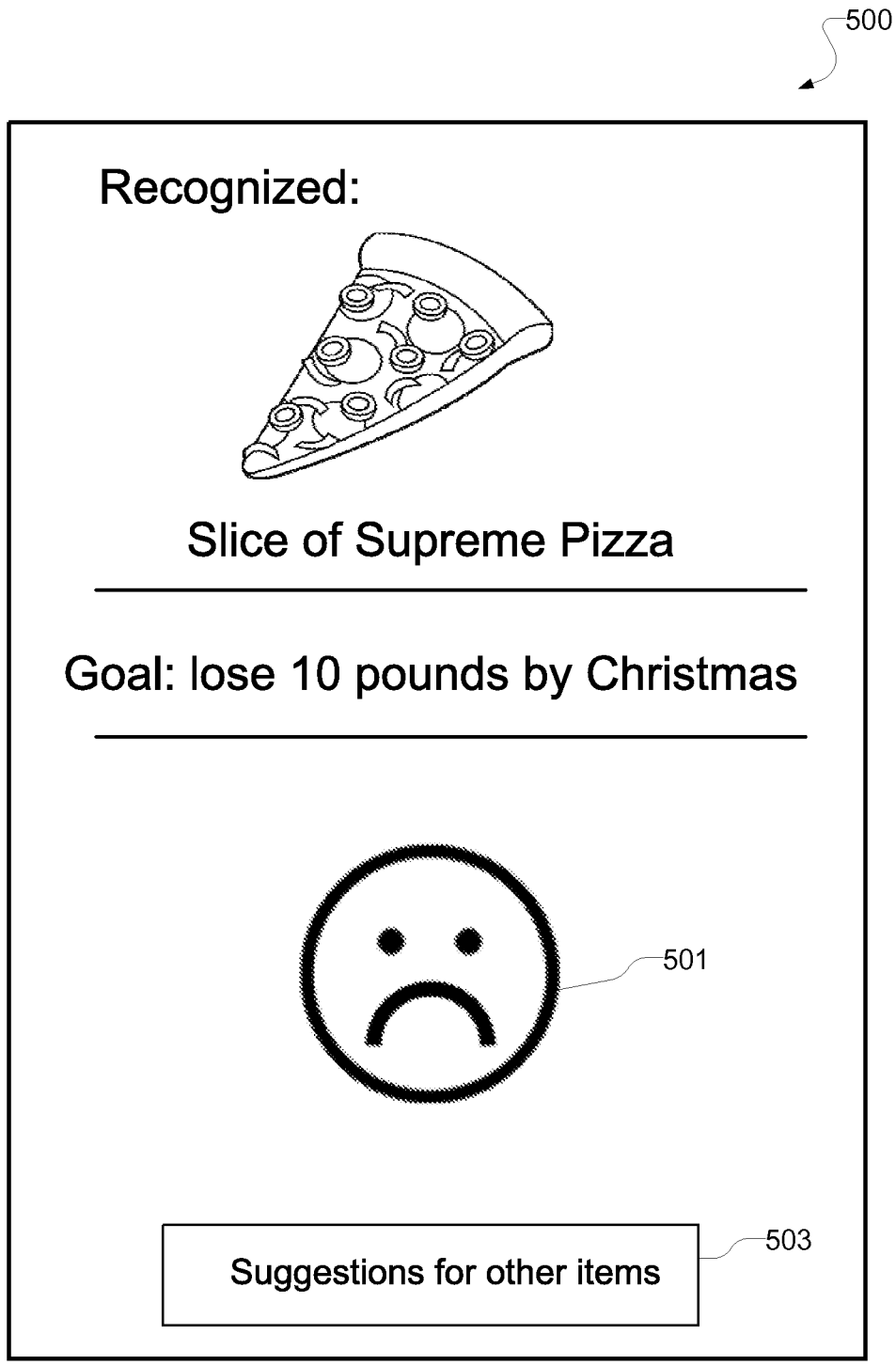
FIG. 5 illustrates an exemplary portion of a user interface displaying visual product feedback information, according to various embodiments.

Using one of the examples described above, if the user scans a bowl of salad and the determination module 202 determines that consumption of this bowl of salad contributes to the user achieving their goal of "lose 10 pounds by Christmas", then the visual product feedback display module 204 may display the user interface 400 illustrated in FIG. 4, which indicates that the visual product feedback system 200 has recognized the product item as a bowl of salad, and identifies the relevant goal of "lose 10 pounds by Christmas", and includes "positive" visual product feedback information 401 corresponding to a smiley face icon. Thus, the user is provided with a simple visual cue that reassures them that the product is suitable. On the other hand, using another one of the examples described above, if the user scans a pizza and the determination module 202 determines that consumption of this pizza does not contribute to the user achieving their goal of "lose 10 pounds by Christmas", then the visual product feedback display module 204 may display the user interface 500 illustrated in FIG. 5, which indicates that the visual product feedback system 200 has recognized the product item as a slice of pizza, and identifies the goal of "lose 10 pounds by Christmas", and includes "negative" visual product feedback information 501 corresponding to a sad face icon. Thus, the user is provided with a simple visual message indicating that the product is not right for them and does not help them to achieve their goal.

If the visual product feedback system 200 is manifested in the mobile device of the user, then the visual product feedback system 200 may display the visual product feedback information (e.g., see user interfaces 400 and 500 in FIGS. 4 and 5) directly on a display of the mobile device. Alternatively, if the visual product feedback system 200 is manifested in one or more remote servers, the visual product feedback system 200 may generate the display in the mobile device of the user by transmitting the appropriate instructions to the mobile device via a network (e.g., the Internet).

For health-related goals, the visual product feedback system 200 may provide visual product feedback information for product items other than food items. For example, if the determination module 202 identifies the product item as an exercise-related item (e.g., a bicycle, skipping rope, weights, exercise bands, etc.), then the determination module 202 may determine that these exercise-related items contribute to the user achieving a particular health-related goal such as "lose 10 pounds by Christmas", and may display the appropriate visual product feedback information, such as a smiley face.

Health-related goals are not limited to goals based on weight loss. For example, a health-related goal may be to "eat more fresh fruits and vegetables". For example, when the user captures an image of a food item corresponding to a fruit or vegetable, the determination module 202 may identify this fruit or vegetable, and access information (e.g., stored in the database 206, or stored at a remote database or storage repository accessible via a network) identifying visual indicators of freshness for the scanned fruit or vegetable (e.g., discoloration). Thus, the determination module 202 may analyze the image capture of the fruit or vegetable in order to determine whether the fruit or vegetable is fresh. If the identified fruits or vegetables are fresh, the visual product feedback display system 200 may display the appropriate positive visual product feedback (e.g., a smiley face icon). As another example, a health-related goal may be to "eat more fruits and vegetables that are in season". For example, the determination module 202 may access geolocation information of the mobile device of the user in order to determine the current location of the user. Thereafter, the determination module 202 may access information (e.g., stored in the database 206, or stored at a remote storage repository accessible via a network) identifying fruits or vegetables that are in season at different locations during various times of the year, in order to determine whether the identified fruits or vegetables are currently in season for the user's location. If the identified fruits or vegetables are currently in season for the user's location, the visual product feedback display system 200 may display the appropriate positive visual product feedback (e.g., a smiley face icon).

Figure 6:
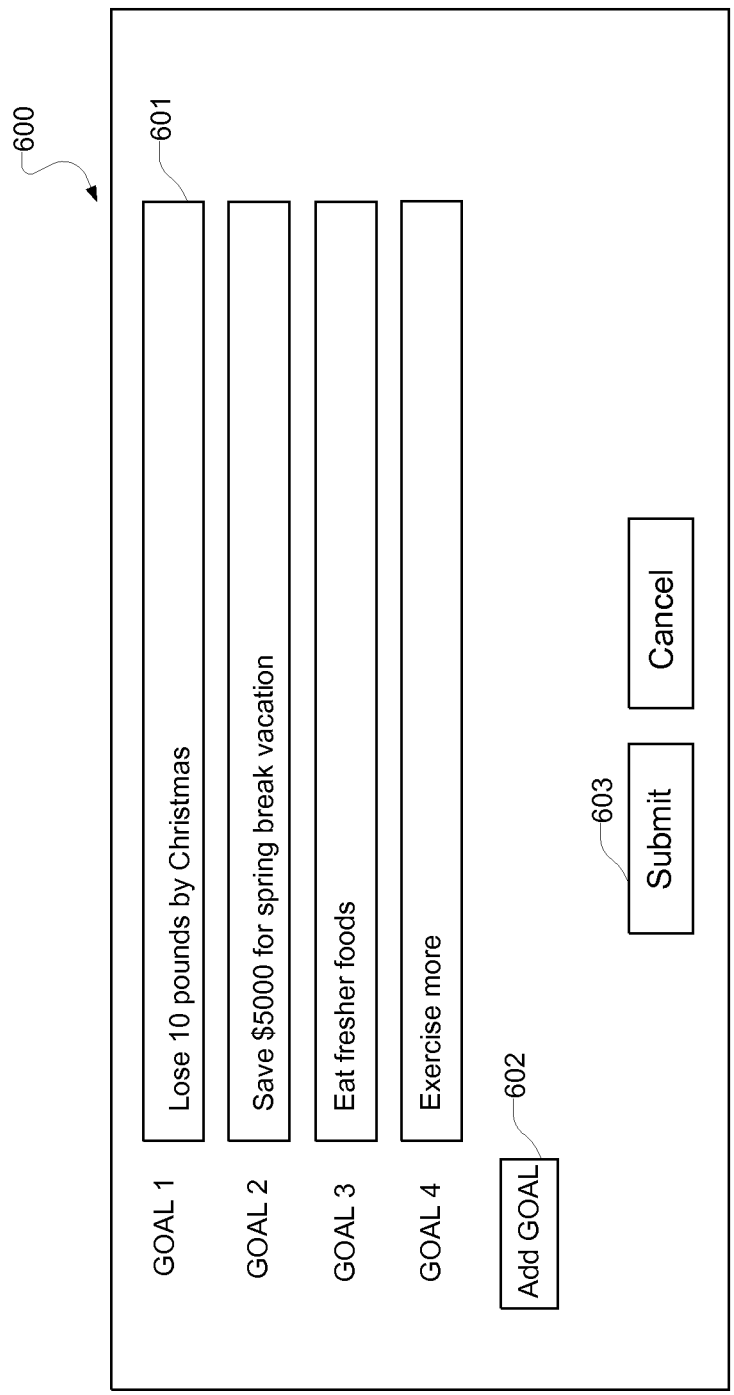
FIG. 6 illustrates an exemplary portion of a user interface configured to receive user specifications of various user goals, according to various embodiments.

As described in various embodiments above, the visual product feedback system 200 may enable the user to specify one or more goals and enter these goals into the visual product feedback system 200. For example, the visual product feedback system 200 may display the user interface 600 illustrated in FIG. 6, which includes various goal entry fields (e.g., 601) allowing the user to specify various goals. The user can select the "add goal" button 602 in order to add additional goals. If the user selects the "submit" button 603, then the goals are submitted and received by the determination module 202. Thereafter, the determination module 202 may generate user goal information indicating specific action items recommendations for the user to achieve these goals.

Figure 7:
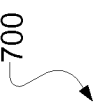
FIG. 7 illustrates an example of user goal information generated by a visual product feedback system, according to various embodiments.

For example, for a health-related goal to "lose 10 pounds by Christmas", the determination module 202 may access more information about the user's current physical condition (e.g., by accessing medical records associated with the user, or by asking the user questions via a user interface), such as the user's current weight, body mass index (BMI), body fat percentage, etc. Thereafter, the determination module 202 may access various medical or weight loss planning information in order to determine the actions the user should take to achieve their goal. For example, the determination module 202 may calculate that, based on the user's current physical condition and the time between now and Christmas, if the user reduces their daily caloric intake to 2000 calories a day and reduces their daily fat intake to 20 g per day between now and Christmas, then the user will lose 10 pounds by Christmas. As another example, for a finance-related goal to "save $2000 for spring break vacation", the determination module 202 may access financial account information of the user (e.g., credit card accounts, checking accounts, PayPal account, other financial accounts, etc.) in order to determine the users regular wage or other income, how much money the user has already saved, spending habits of the user, how much the user spends on a typical day, and so on. Thereafter, the determination module 202 may calculate that, based on the user's income and the amount of time between now and spring break, if the user spends no more than $500 a week between now and spring break, then the user will save $2000 by spring break. An example of user goal information 700 generated by the determination module 202 is illustrated in FIG. 7, where the user goal information 700 identifies various user goals, as well as various recommended action items for achieving the goal (e.g., consumption limits, spending limits, etc.).

Figure 8:
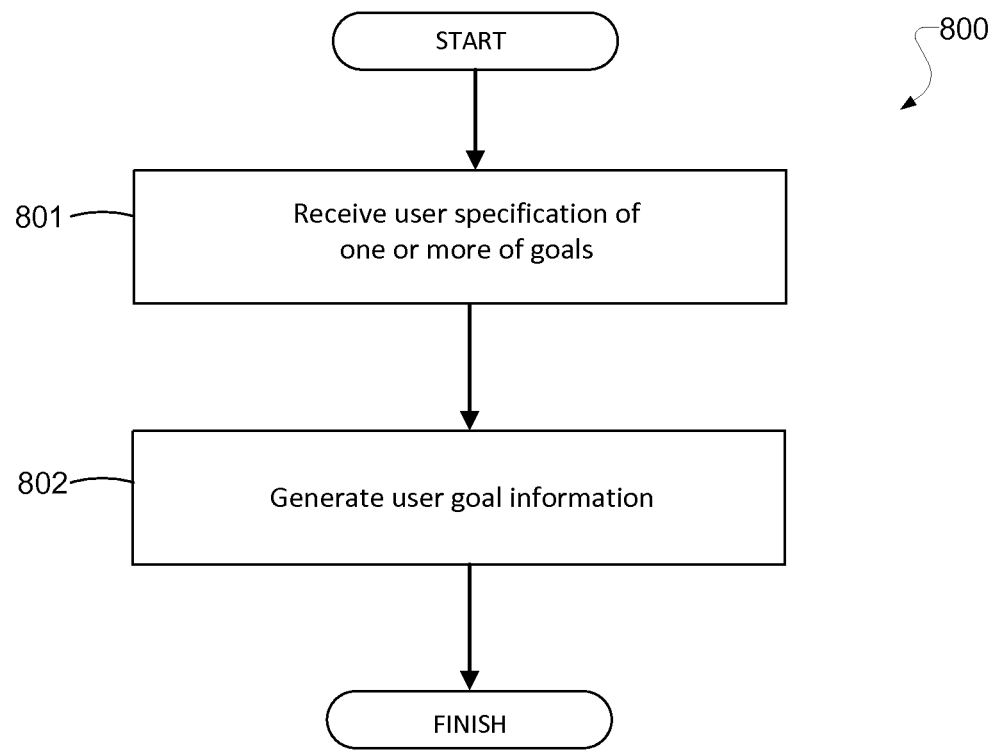
FIG. 8 is a flowchart illustrating an example method, according to various embodiments.

FIG. 8 is a flowchart illustrating an example method 800, consistent with various embodiments described above. The method 800 may be performed at least in part by, for example, the visual product feedback system 200 illustrated in FIG. 2 (or an apparatus having similar modules, such as client machines 110 and 112 or application server 112 illustrated in FIG. 1). In 801, the determination module 202 receives a user specification of one or more goals that may have associated target dates, such as "lose 10 pounds by Christmas" or "save $5000 for spring break vacation". For example, the determination module 202 may receive the user specification via the user interface 600 illustrated in FIG. 6. In 802, the determination module 202 generates user goal information based on the user goals specified in 801. The user goal information may identify one or more user goals having target dates, and various action items for achieving the user goals by the target dates. An example of user goal information 700 is illustrated in FIG. 7.

According to another exemplary embodiment, the visual product feedback system 200 may automatically infer user goals for the user, by analyzing a calendar of the user and detecting upcoming events or occasions listed in the user's calendar. For example, the visual product feedback system 200 may prompt the user for login information (e.g., user name, password, etc.) in order to access a user account for a planner program/application or calendar program/application (e.g., a calendar function of a Microsoft Outlook account, Google calendar, etc.). Once the determination module 202 has access to the calendar, the determination module 202 may scan keywords in the calendar to detect upcoming events, such as vacations (e.g., spring break), holidays (e.g., Thanksgiving, Christmas, etc.), special occasions (e.g., weddings, birthdays, reunions, etc.), and so on. The determination module 202 may then infer a user goal having an associated target date (such as "lose weight for Christmas", "eat healthy before my 30th birthday", "save money for a vacation", and so on), based on the scanned upcoming events in the user's calendar. The determination module 202 may infer these goals based on previous goals submitted to the visual product feedback system 200 by the user (e.g., via the user interface 600 illustrated in FIG. 6), such as goals submitted to the visual product feedback system 200 by the user in previous years. The determination module 202 may also infer these goals based on previous goals submitted by other users to the visual product feedback system 200 (e.g., other users that the determination module 202 determines are similar to the current user, based on similarity in the location, age, education, ethnicity, other demographic or biographic information, etc., of the other users and the current user). After inferring the user goals for the user, the determination module 202 may generate the appropriate user goal information, consistent with various embodiments described throughout.

Figure 9:
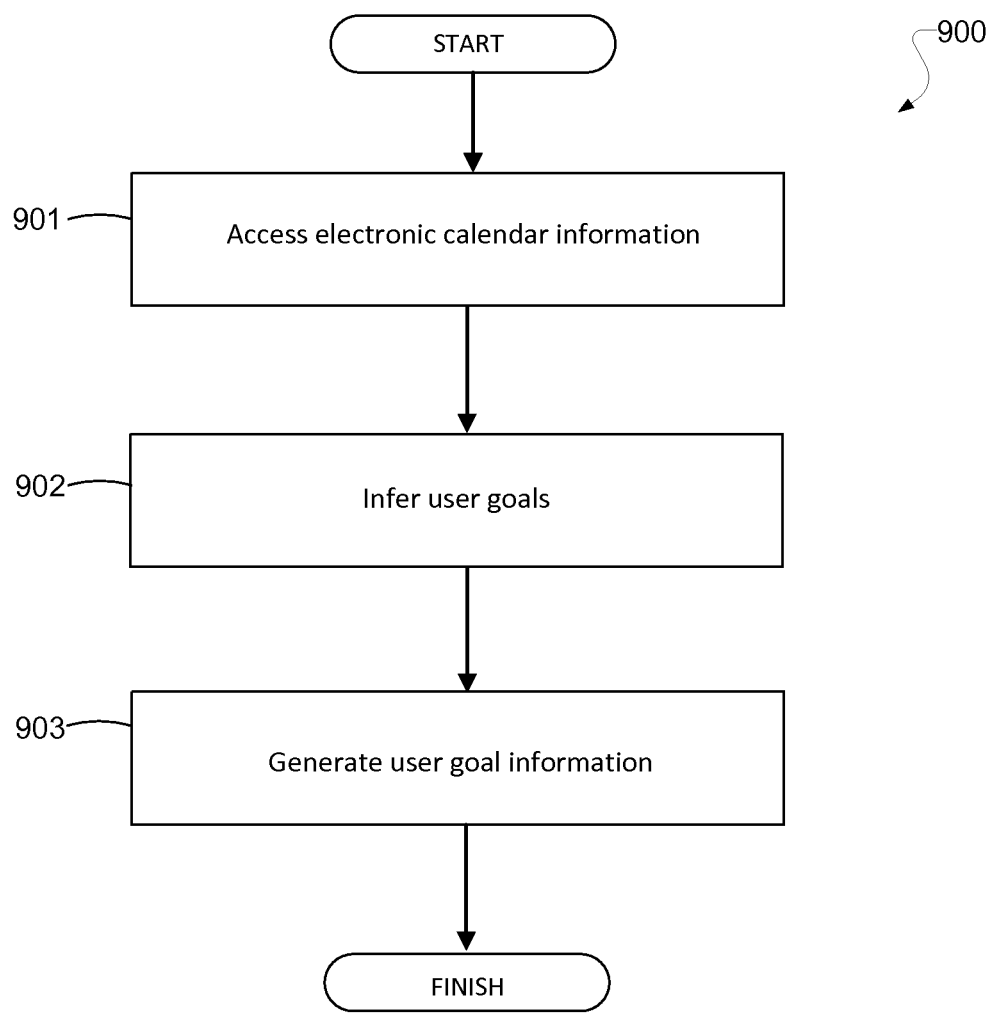
FIG. 9 is a flowchart illustrating an example method, according to various embodiments.

FIG. 9 is a flowchart illustrating an example method 900, consistent with various embodiments described above. The method 900 may be performed at least in part by, for example, the visual product feedback system 200 illustrated in FIG. 2 (or an apparatus having similar modules, such as client machines 110 and 112 or application server 112 illustrated in FIG. 1). In 901, the determination module 202 accesses electronic calendar information associated with the user. In 902, the determination module 202 infers a user goal, based on one or more future calendar events identified in the calendar information. In 903, the determination module 202 generates user goal information, based on the user goal inferred in 902. An example of user goal information 700 is illustrated in FIG. 7.

Figure 10:
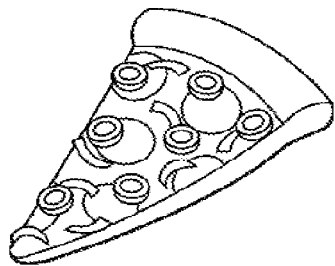
FIG. 10 illustrates an exemplary portion of a user interface displaying visual product feedback information, according to various embodiments.
Figure 10:

According to various exemplary embodiments, the visual product feedback system 200 is configured to take into account whether the user is viewing a product item on a "cheat day" or "off day" (e.g., a day when the user is on vacation, on holiday, attending a special occasion, a designated cheat day such as Saturday or Sunday, etc.), when displaying the visual product feedback information to the user. In other words, the visual product feedback system 200 understands that the user may want to treat themselves every now and then, when appropriate, and the visual product feedback system 200 knows when to make exceptions in providing negative feedback at such times, in the greater interest of the user achieving the goal. For example, in a scenario described above, when the user scans a slice of pizza on a regular day, the determination module 202 may determine that consumption of this pizza may not be helping the user achieve their goal of "lose 10 pounds by Christmas". Thus, the visual product feedback display module 204 may display negative visual product feedback information (see FIG. 5). However, if the user scans the slice of pizza when the user is on vacation or on a cruise, for example, the determination module 202 may determine that the user temporarily does not wish to adhere to such dietary restrictions. Thus, if the user scans the slice of pizza while on vacation, the visual product feedback display module 204 may display the user interface 1000 and FIG. 10, which displays positive visual product feedback information 1001.

As another example, when the user usually scans an expensive entrée such as lobster on a regular day, the determination module 202 may determine that purchasing this expensive entrée may not be helping the user achieve their goal of "save $5000 for spring break vacation". Thus, the visual product feedback display module 204 may usually display negative visual product feedback information. However, if the user scans the expensive entrée during the user's wedding anniversary, for example, the determination module 202 may determine that the user temporarily does not wish to adhere to spending limits on this important occasion. Thus, if the user scans the expensive entrée during their wedding anniversary, the visual product feedback display module 204 may display positive visual product feedback information (e.g., a smiling face) to indicate that it is okay to buy the entrée.

The determination module 202 may determine that the user is viewing a product item when they are on a cheat day by scanning calendar information of the user. For example, the visual product feedback system 200 may prompt the user for login information (e.g., user name, password, etc.) in order to access a user account for a planning program/application or calendar program/application (e.g., a calendar function of a Microsoft Outlook account, Google calendar, etc.). Once the determination module 202 has access to the calendar, the determination module 202 may scan keywords in the calendar to detect upcoming events, such as vacations (e.g., spring break), holidays (e.g., Thanksgiving, Christmas, etc.), special occasions (e.g., weddings, birthdays, reunions, etc.), and so on. The determination module 202 may also determine that the user is on a cheat day by analyzing a social media profile of the user to detect status updates indicating that, for example, the user is on a holiday or vacation, or social media profile information indicating that it is the user's birthday or wedding anniversary, and so on. As another example, the user may directly enter their desired cheat days into the visual product feedback system 200. For example, the user may enter designations of cheat days into one of the goal entry fields (e.g., 601) in the user interface 600 of FIG. 6, such as statements like "I want to be able to eat what I want on Sundays", or "I want to be able to eat pizza every second weekend", or "I want to be able to splurge on my wedding anniversary", and so on.

Figure 11:
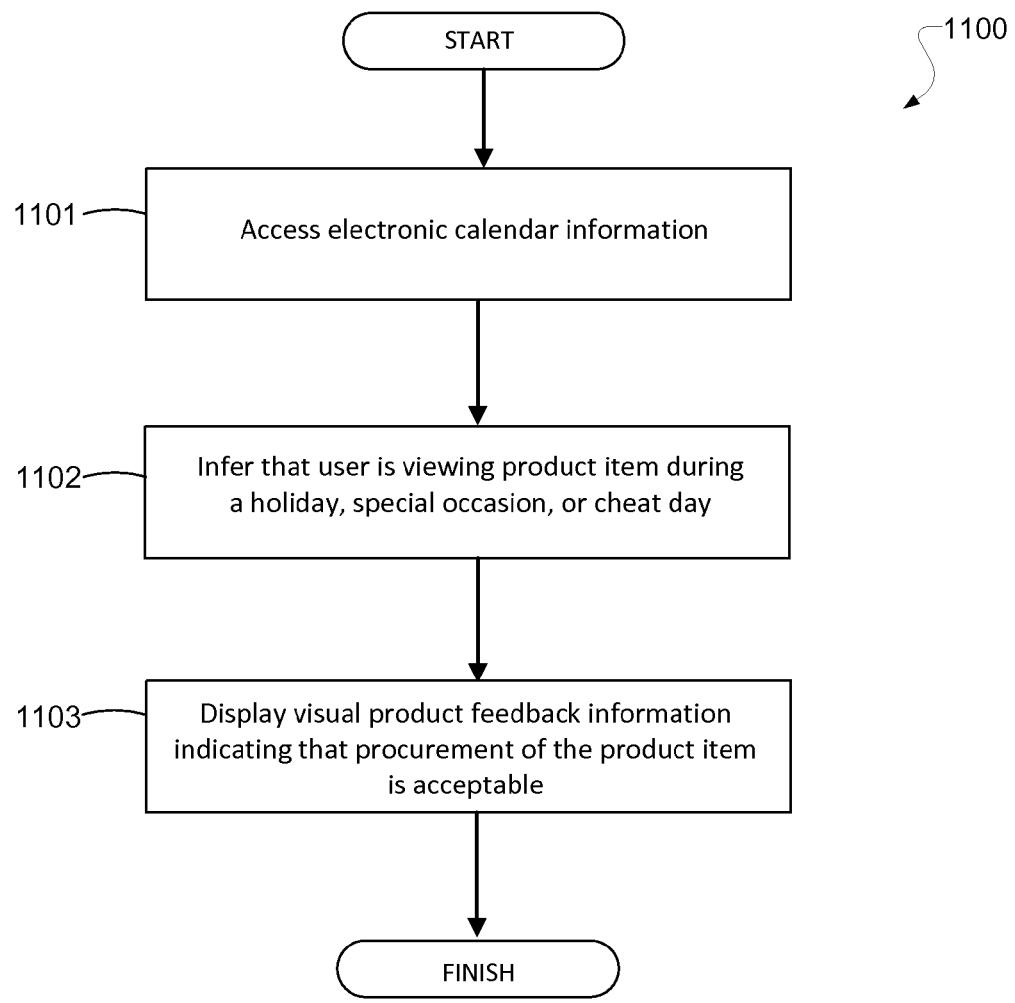
FIG. 11 is a flowchart illustrating an example method, according to various embodiments.

FIG. 11 is a flowchart illustrating an example method 1100, consistent with various embodiments described above. The method 1100 may be performed at least in part by, for example, the visual product feedback system 200 illustrated in FIG. 2 (or an apparatus having similar modules, such as client machines 110 and 112 or application server 112 illustrated in FIG. 1). The method 1100 may occur after the method 300 illustrated in FIG. 3. In 1101, the determination module 202 accesses electronic calendar information associated with the user. In 1102, the determination module 202 infers, based on the electronic calendar information of the user, that the user is viewing a product item during a cheat day, vacation, holiday, special occasion, etc. In 1103, the determination module 202 generates a display, via the user interface in the mobile device of the user, of visual product feedback information indicating that procurement of a product item (e.g., a product item identified in 301 in FIG. 3) is acceptable.

According to various exemplary embodiments, if the determination module 202 determines that the product item being viewed by the user is not helping the user achieve their goals, the determination module 202 may also provide the user with suggestions for alternative items that do help the user achieve their goals. For example, referring back to FIG. 5, the user interface 500 includes negative visual product feedback information 501 displayed to a user when the user scans a slice of pizza. Moreover, the user interface 500 includes a button 503 entitled "suggestions for other items" which, when selected by the user, provides the user with suggestions for alternative items located near the user that help the user achieve their goal. For example, if the user selects the button 503 in FIG. 5, the visual product feedback display module 204 may display the user interface 1200 in FIG. 12, which includes various product items (e.g., 1201) available close to the user's current location that may help the user achieve their goal. If the user selects on one of the product items (e.g., 1201), the visual product feedback system 200 may display information regarding where the user can obtain this product (e.g., directions to the appropriate store or restaurant), and permit the user to place an order for this product item for delivery or pickup.

For example, if the determination module 202 determines that the product item being viewed by the user is not helping the user achieve their goals, the determination module 202 may determine the current location of the user (e.g., a restaurant, a retail store, a business) using geolocation information from the user's mobile device. The determination module 202 may then access product directory information (e.g., stored in a remote database or storage repository accessible via a network) indicating various products available near the current location of the user. For example, if the user scans a food item in a restaurant, the determination module 202 may access menu information for the restaurant that the user is currently inside, or menu information for other stores in a mall that the user is currently inside, and so on. As another example, if the user is scanning a product item in a home furnishings store, the determination module 202 may access product catalog information for the home furnishings store, or product catalog information for other home furnishing stores near the user, and so on. Thereafter, the determination module 202 may identify some of the products in the product directory information (e.g., menu or product catalog) that helps the user achieve their goal, such as food items that fit within the dietary restrictions described in the user goal information for the user, or product items that fit within the spending limits described in the user goal information for the user, and so on. The visual product feedback display module 204 may then display these suggestions to the user.

Figure 12:
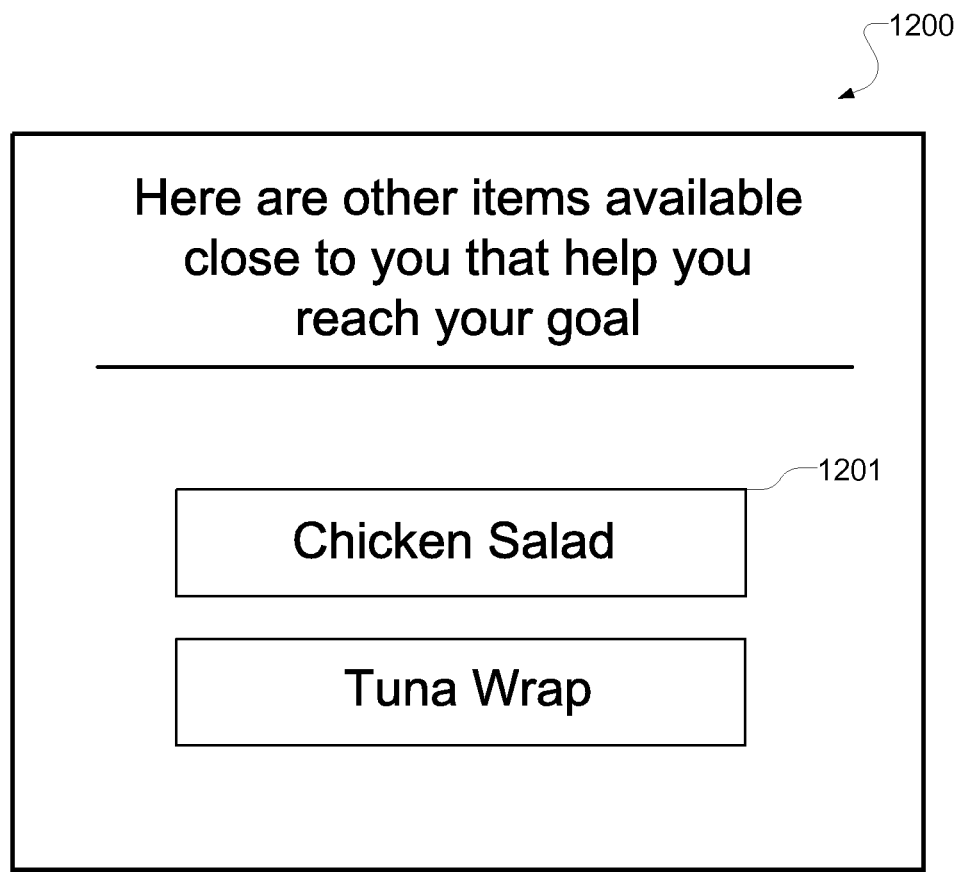
FIG. 12 illustrates an exemplary portion of a user interface displaying suggestions for alternative product items, according to various embodiments.
Figure 13:
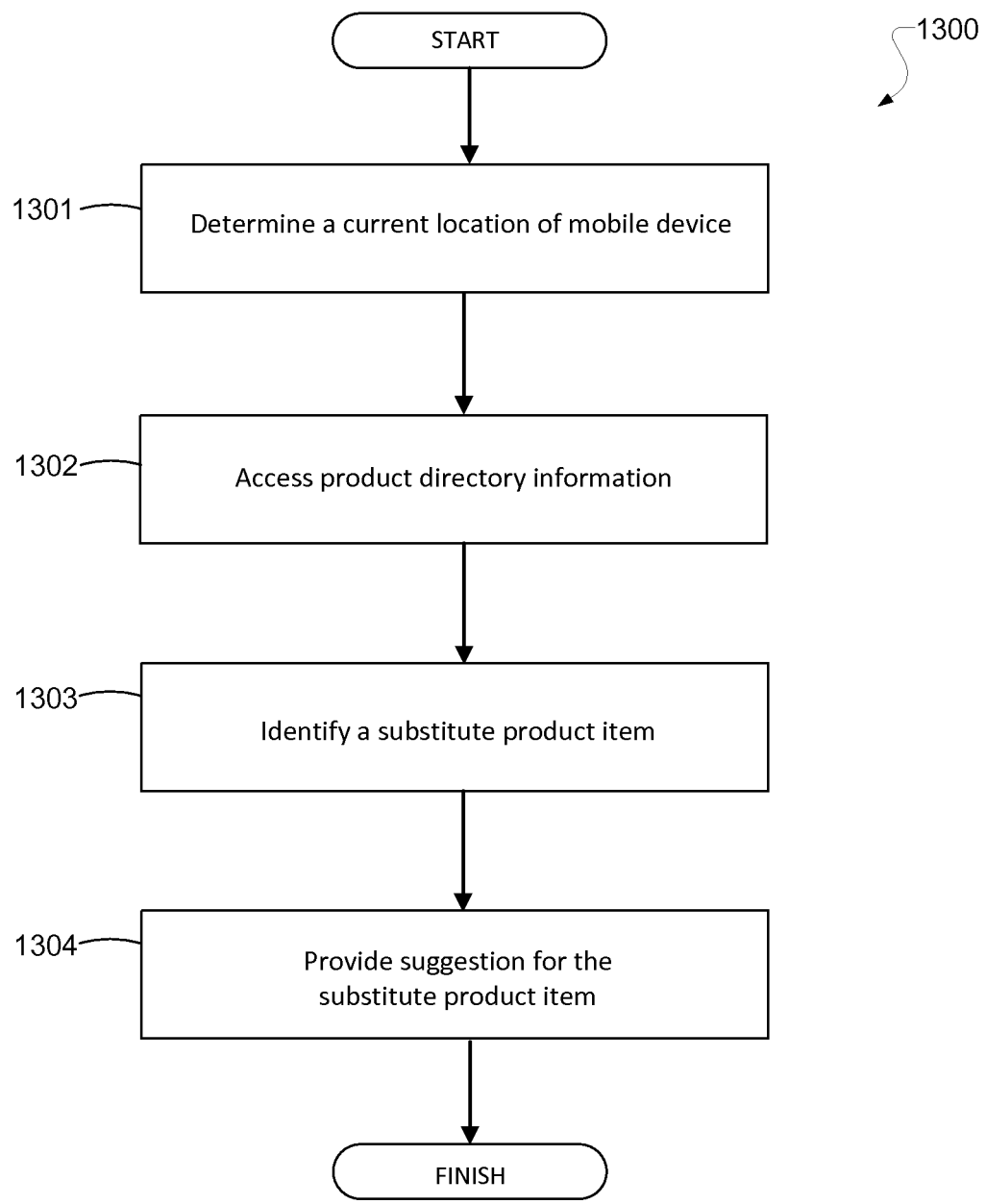
FIG. 13 is a flowchart illustrating an example method, according to various embodiments.

FIG. 13 is a flowchart illustrating an example method 1300, consistent with various embodiments described above. The method 1300 may be performed at least in part by, for example, the visual product feedback system 200 illustrated in FIG. 2 (or an apparatus having similar modules, such as client machines 110 and 112 or application server 112 illustrated in FIG. 1). The method 1300 may occur after the method 300 illustrated in FIG. 3 and, in one example embodiment, may occur after the determination module 202 determines (in 303 in FIG. 3) that procurement of the product item does not contribute to the user achieving their user goal. In 1301, the determination module 202 determines a current location of the user (e.g., a restaurant, a retail store, a business) using geolocation information from the user's mobile device. In 1302, the determination module 202 accesses product directory information identifying one or more product items available at or near the current location. In 1303, the determination module 202 identifies a substitute product item included in the product directory information that contributes to the user achieving a user goal. In 1304, the determination module 202 provides a suggestion for the substitute product item to the user. FIG. 12 illustrates an example of suggestions for substitute product items that are provided to the user via the user interface 1200.

Figure 14:
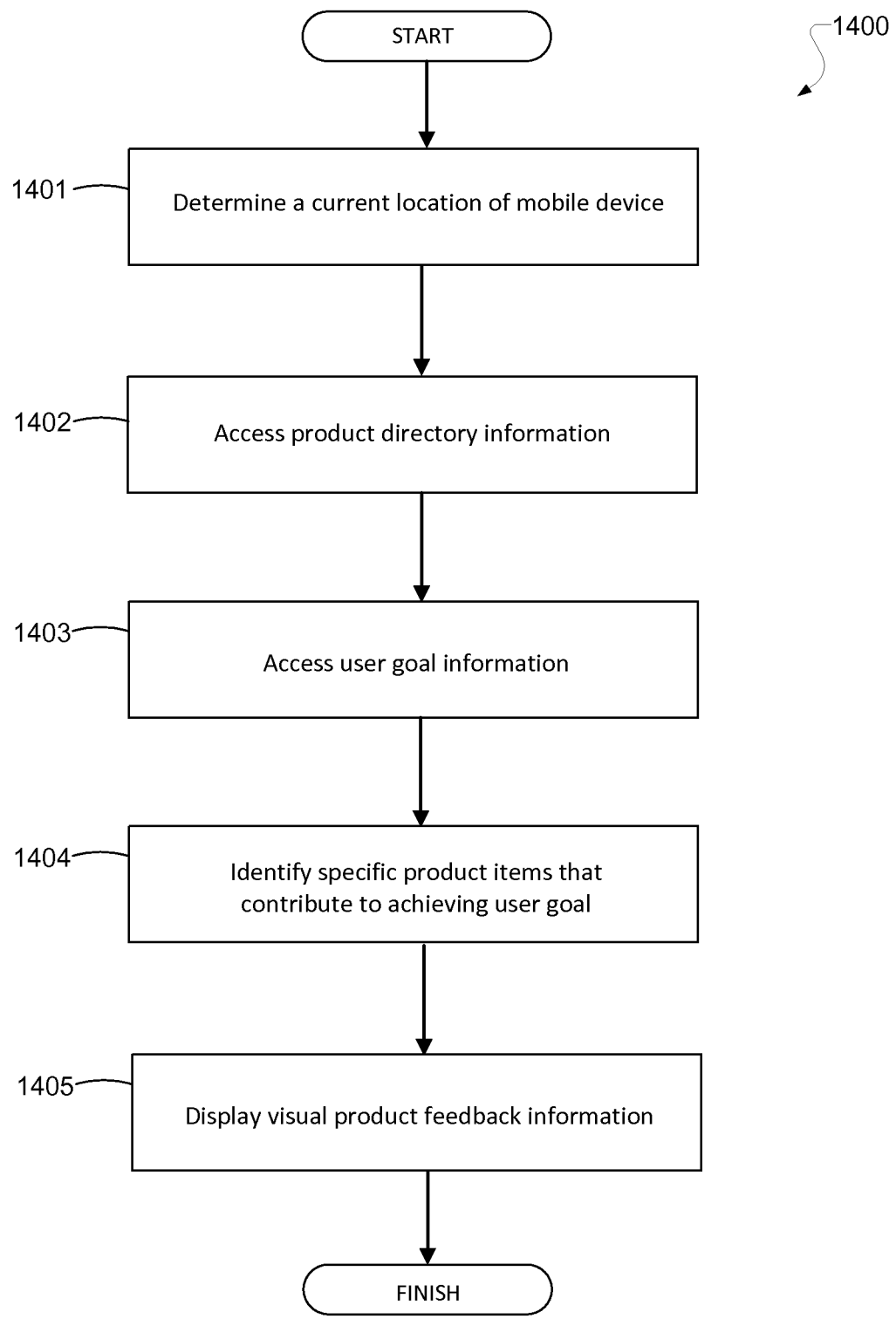
FIG. 14 is a flowchart illustrating an example method, according to various embodiments.

According to another exemplary embodiment, the visual product feedback system 200 may provide the user with visual product feedback information of various product items offered at a particular location (e.g., a restaurant, a retail store, business, etc.), when the user enters that location. For example, FIG. 14 is a flowchart illustrating an example method 1400, according to various exemplary embodiments. The method 1400 may be performed at least in part by, for example, the visual product feedback system 200 illustrated in FIG. 2 (or an apparatus having similar modules, such as client machines 110 and 112 or application server 112 illustrated in FIG. 1). In 1401, the determination module 202 determines a current location of a mobile device of a user. In 1402, the determination module 202 accesses product directory information identifying available product items available at or near the current location. For example, if the user is located in a restaurant, the determination module 202 may access menu information for that restaurant. As another example, if the user is located in a home furnishings store, the determination module 202 may access product catalog information for the home furnishings store. In 1403, the determination module 202 accesses user goal information describing a user goal corresponding to a health-related goal or a finance-related goal. Examples of user goal information are described elsewhere in this disclosure (e.g., see FIG. 7). In 1404, the determination module 202 identifies one or more specific "desirable" product items from among the available products items (this were identified in 1402) that contribute to achieving the user goal. For example, if the user is located in a restaurant, the determination module 202 may determine desirable items on the restaurant's menu that do not break the user's food intake limits described in the user goal information for the user, and that therefore help the user achieve the goal of "lose 10 pounds by Christmas". As another example, if the user is located in a home furnishings store, the determination module 202 may identify desirable items in the product catalog for the home furnishing store the do not break the user's daily budget described in the user goal information for the user, and that therefore help the user achieve the goal of "save $5000 for spring break vacation".

In 1405, the visual product feedback display module 204 generates a display, via a user interface in the mobile device, of visual product feedback information. For example, the visual product feedback information may identify or list the desirable items identified in 1404 that help the user achieve their goal along with indicia (e.g., smiling face icons)

displayed in proximity to one or more of these items. As another example, the visual product feedback information may include "positive" visual product feedback information or indicia (e.g., a smiley face icon) representing the group of desirable product items that may help contribute to the user achieving the user goal, and if the user selects this positive indicia, the user is provided with more information about the desirable product items. Similarly, the visual product feedback information may also include "negative" visual product feedback information or indicia (e.g., a sad face icon) representing the undesirable product items that do not help contribute to the user achieving the user goal, and if the user selects this negative indicia, the user is provided with more information about these undesirable product items.

Figure 15:
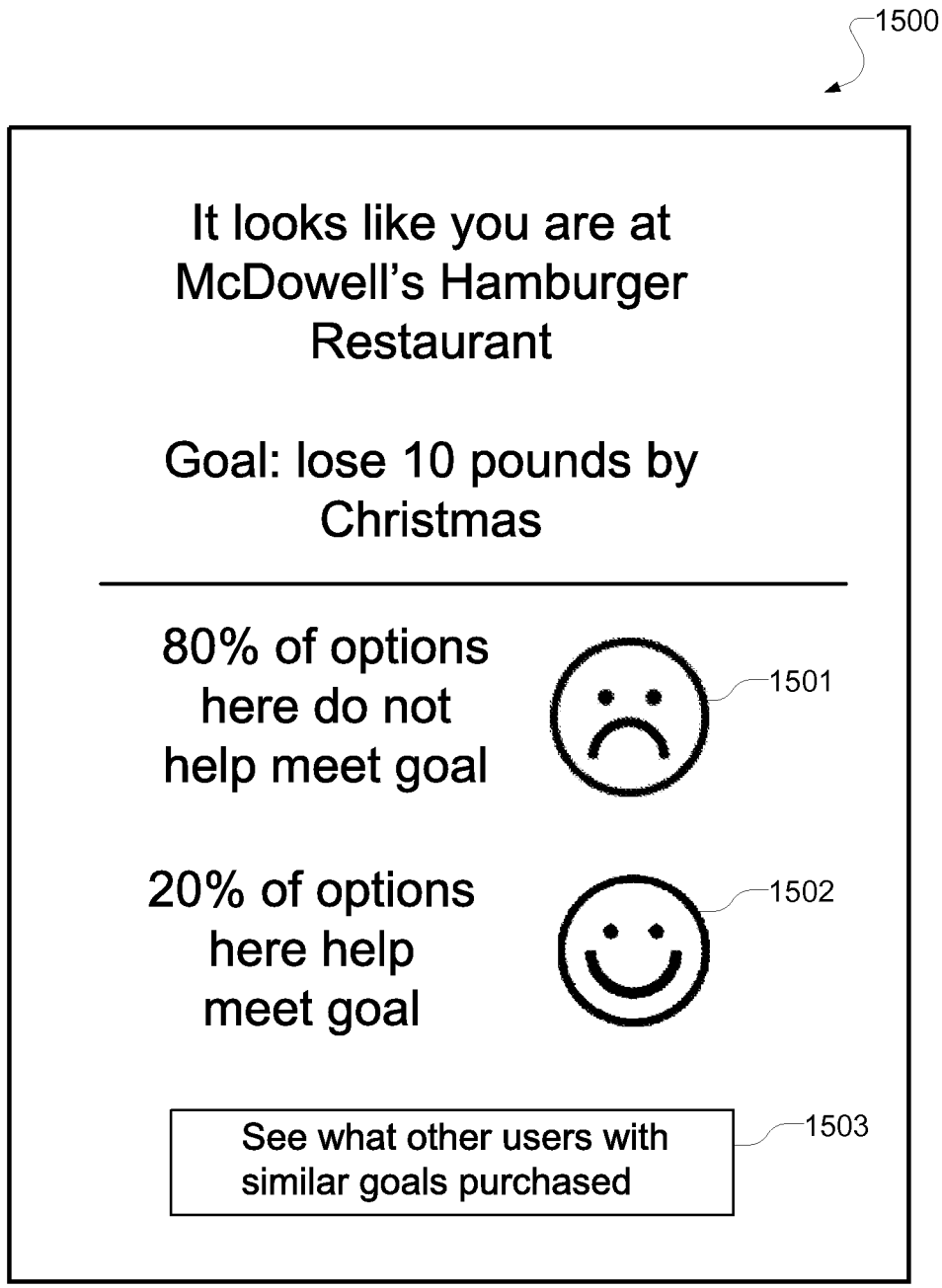
FIG. 15 illustrates an exemplary portion of a user interface displaying visual product feedback information, according to various embodiments.
Figure 16:
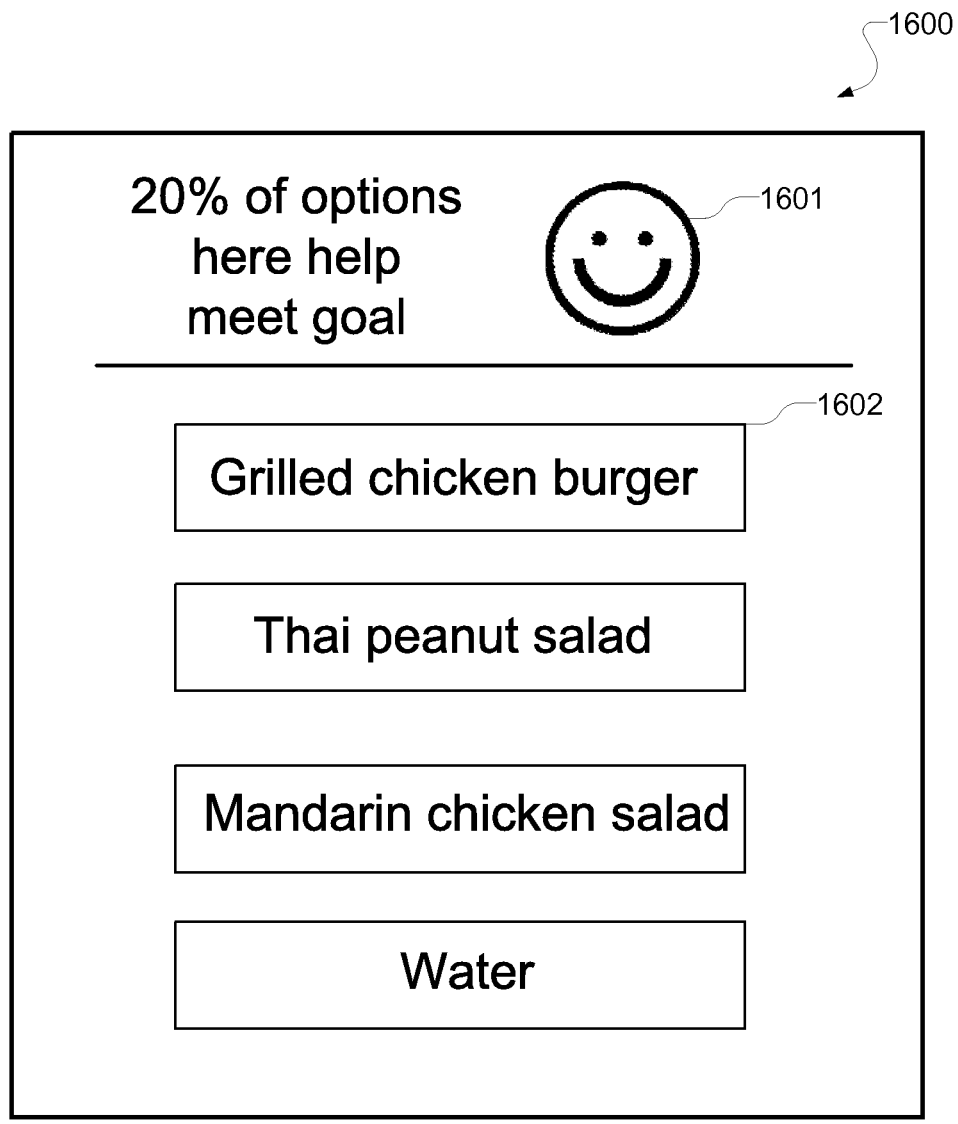
FIG. 16 illustrates an exemplary portion of a user interface displaying various product items, according to various embodiments.

For example, FIG. 15 illustrates the user interface 1500 displayed by the visual product feedback display module 204 that includes negative visual product feedback information 1501 (e.g., a sad face icon) indicating that 80% of the options available at the current location do not help the user achieve their goal, and includes positive visual product feedback information 1502 (e.g., a smiling face icon) indicating that 20% of the options available at the current location do help the user achieve their goal. If the user selects the positive indicia of 1502, the visual product feedback display module 204 may display the user interface 1600 in FIG. 16, which includes lists various desirable product items (e.g. 1601) available at the current location (e.g., restaurant, retail business) that may help the user achieve their goal. If the user selects on one of the product items (e.g., 1601), the visual product feedback display module 204 may display more information regarding the selected product item, and may permit the user to place an order for the selected product item.

Figure 17:
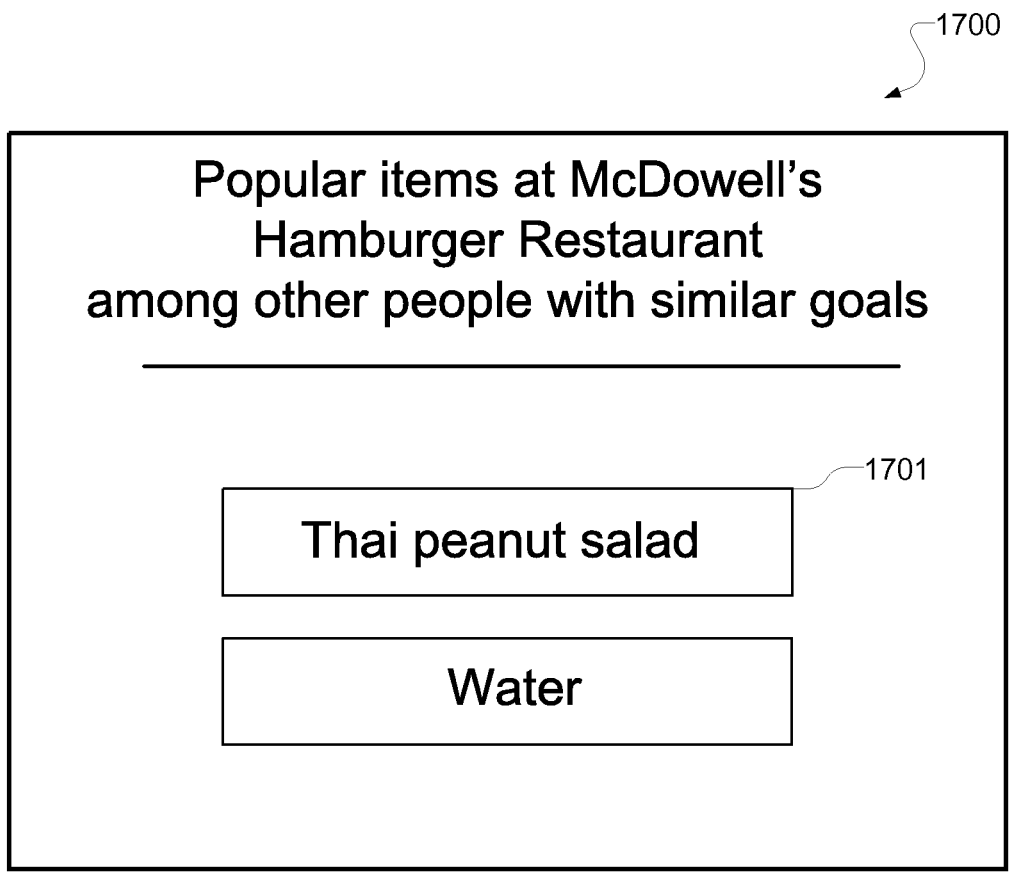
FIG. 17 illustrates an exemplary portion of a user interface displaying various product items, according to various embodiments.

According to various exemplary embodiments, when a user having a user goal enters a restaurant, retail store, business, or other location, the visual product feedback system 200 may determine product items that may help the user achieve their goal, based on items at that location that are popular (e.g., commonly purchased or highly rated on a rating service such as Yelp) by other users having similar goals. For example, if a user walks into the McDowell's Hamburger Restaurant, and the visual product feedback system 200 is aware that the user has a goal to "lose 10 pounds by Christmas", the visual product feedback system 200 may determine the set of desirable items available at the user's current location that help the user achieve their goal (as described in various embodiments above), and then filter those desirable items to surface those that are frequently purchased or highly rated by other users that have a similar goal. For example, referring back to the user interface 1500 of FIG. 15, if the user selects the user interface element 1503, the visual product feedback display module 204 may display the user interface 1700 illustrated in FIG. 17, which identifies items (e.g., 1701) available at the current location that help the user achieve their goal and that are popular with other users having similar goals. If the user selects on one of the product items 1701, the visual product feedback display module 204 may display more information regarding the selected product item, and may permit the user to place an order for the selected product item.

Figure 18:
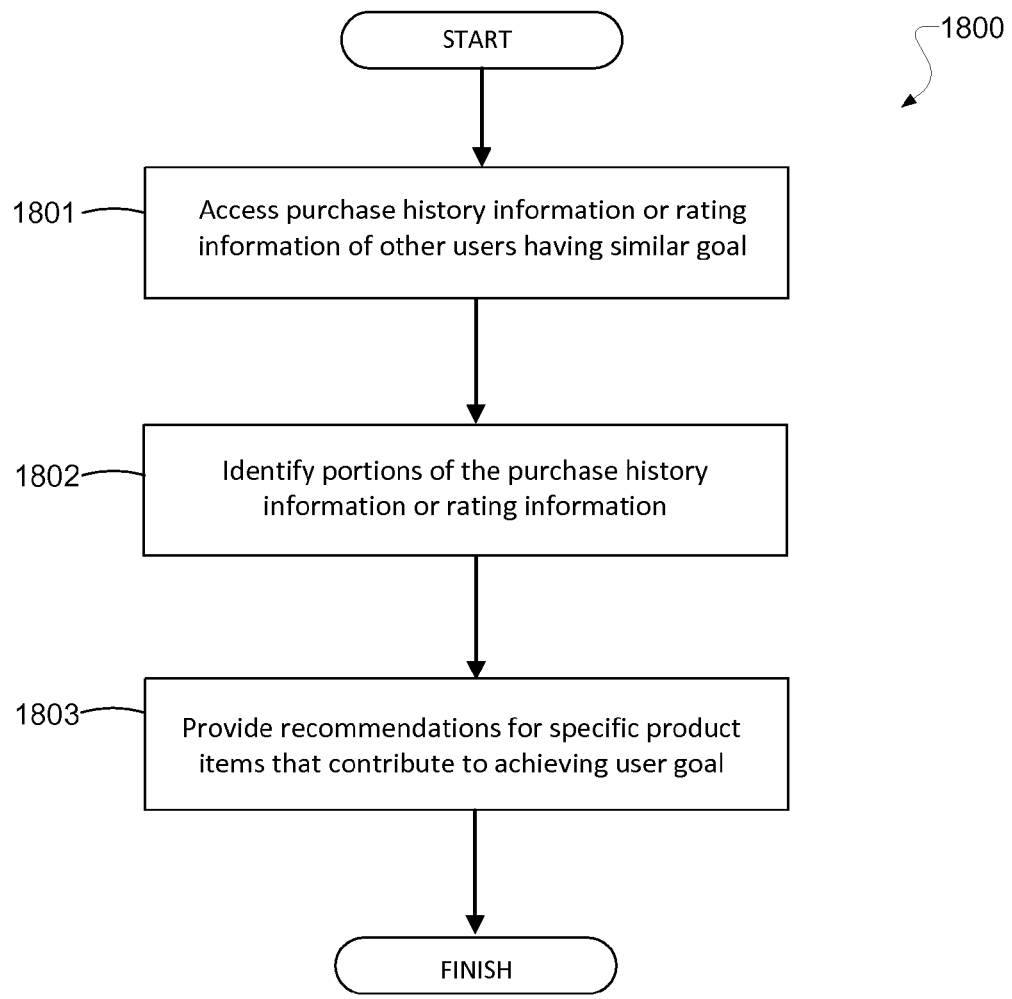
FIG. 18 is a flowchart illustrating an example method, according to various embodiments.

FIG. 18 is a flowchart illustrating an example method 1800, consistent with various embodiments described above. The method 1800 may be performed at least in part by, for example, the visual product feedback system 200 illustrated in FIG. 2 (or an apparatus having similar modules, such as client machines 110 and 112 or application server 112 illustrated in FIG. 1). The method 1800 may be performed after the method 1400 illustrated in FIG. 14. In 1801, the determination module 202 accesses purchase history information or rating information of other users that have goal information similar to the user goal information of the user. In 1802, the determination module 202 identifies portions of the purchase history information or rating information associated with the user's current location (e.g., a restaurant, retail business, store, etc.). In other words, the determination module 202 identifies product items available at the user's current location that other users (having similar goals) have purchased or rated highly. In 1803, the visual product feedback display module 204 provides recommendations to the user for one or more of the product items identified in 1802 that contribute to achieving the user goal.

Modules, Components and Logic

Certain embodiments are described herein as including logic or a number of components, modules, or mechanisms. Modules may constitute either software modules (e.g., code embodied (1) on a non-transitory machine-readable medium or (2) in a transmission signal) or hardware-implemented modules. A hardware-implemented module is tangible unit capable of performing certain operations and may be configured or arranged in a certain manner. In example embodiments, one or more computer systems (e.g., a standalone, client or server computer system) or one or more processors may be configured by software (e.g., an application or application portion) as a hardware-implemented module that operates to perform certain operations as described herein.

In various embodiments, a hardware-implemented module may be implemented mechanically or electronically. For example, a hardware-implemented module may comprise dedicated circuitry or logic that is permanently configured (e.g., as a special-purpose processor, such as a field programmable gate array (FPGA) or an application-specific integrated circuit (ASIC)) to perform certain operations. A hardware-implemented module may also comprise programmable logic or circuitry (e.g., as encompassed within a general-purpose processor or other programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" should be understood to encompass a tangible entity, be that an entity that is physically constructed, permanently configured (e.g., hardwired) or temporarily or transitorily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor configured using software, the general-purpose processor may be configured as respective different hardware-implemented modules at different times. Software may accordingly configure a processor, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules may be regarded as being communicatively coupled. Where multiple of such hardware-implemented modules exist contemporaneously, communications may be achieved through signal transmission (e.g., over appropriate circuits and buses) that connect the hardware-implemented modules. In embodiments in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation, and store the output of that operation in a memory device to which it is communicatively coupled. A further hardware-implemented module may then, at a later time, access the memory device to retrieve and process the stored output. Hardware-implemented modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., Application Program Interfaces (APIs).)

Electronic Apparatus and System

Example embodiments may be implemented in digital electronic circuitry, or in computer hardware, firmware, software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry, e.g., a field programmable gate array (FPGA) or an application-specific integrated circuit (ASIC).

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that that both hardware and software architectures require consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set out hardware (e.g., machine) and software architectures that may be deployed, in various example embodiments.

Example Machine Architecture and Machine-Readable Medium

Figure 19:
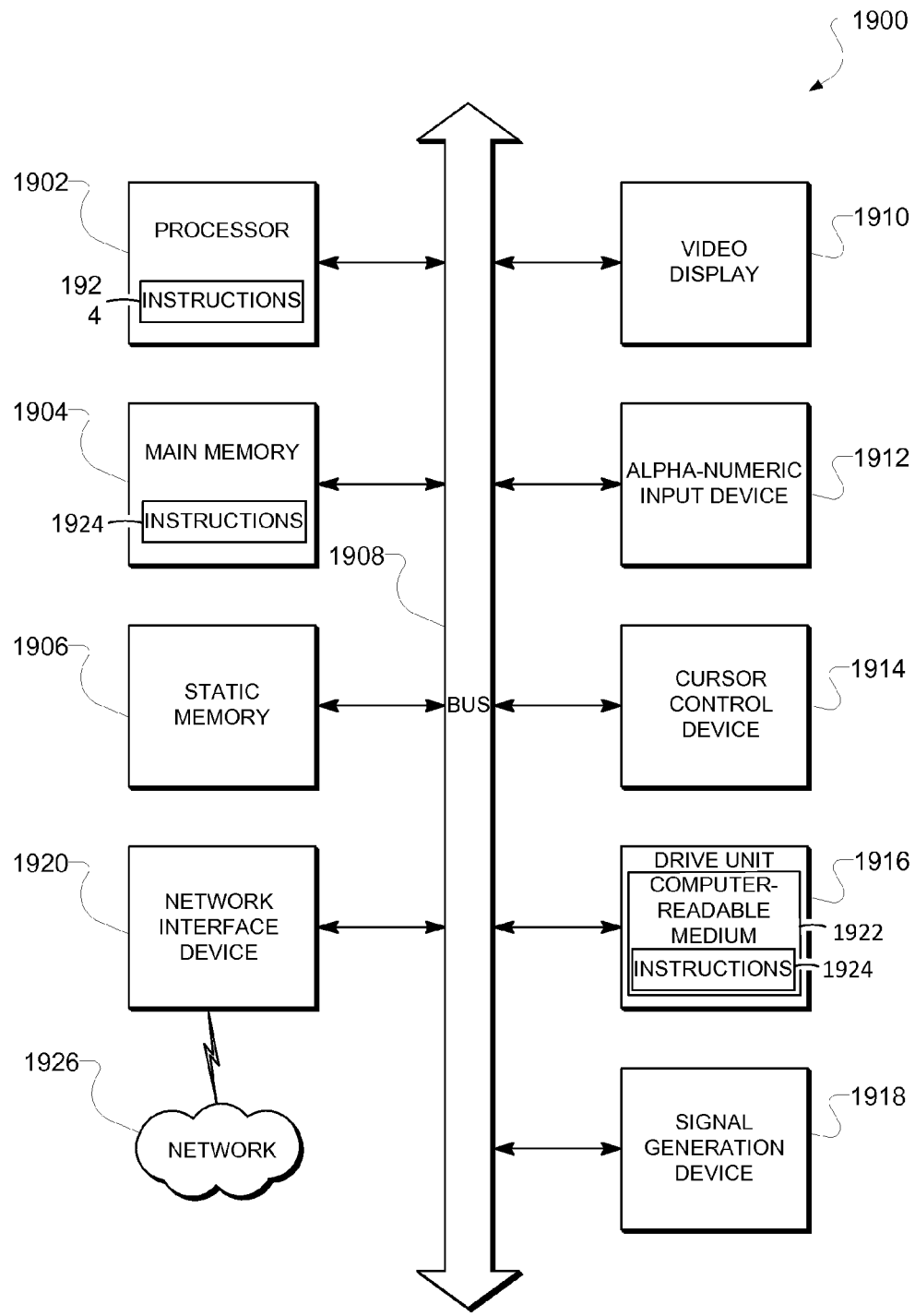
FIG. 19 is a diagrammatic representation of a machine in the example form of a computer system within which a set of instructions, for causing the machine to perform any one or more of the methodologies discussed herein, may be executed.

FIG. 19 is a block diagram of machine in the example form of a computer system 1900 within which instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1900 includes a processor 1902 (e.g., a central processing unit (CPU), a graphics processing unit (GPU) or both), a main memory 1904 and a static memory 1906, which communicate with each other via a bus 1908. The computer system 1900 may further include a video display unit 1910 (e.g., a liquid crystal display (LCD) or a cathode ray tube (CRT)). The computer system 1900 also includes an alphanumeric input device 1912 (e.g., a keyboard or a touch-sensitive display screen), a user interface (UI) navigation device 1914 (e.g., a mouse), a disk drive unit 1916, a signal generation device 1918 (e.g., a speaker) and a network interface device 1920.

Machine-Readable Medium

The disk drive unit 1916 includes a machine-readable medium 1922 on which is stored one or more sets of instructions and data structures (e.g., software) 1924 embodying or utilized by any one or more of the methodologies or functions described herein. The instructions 1924 may also reside, completely or at least partially, within the main memory 1904 and/or within the processor 1902 during execution thereof by the computer system 1900, the main memory 1904 and the processor 1902 also constituting machine-readable media.

While the machine-readable medium 1922 is shown in an example embodiment to be a single medium, the term "machine-readable medium" may include a single medium or multiple media (e.g., a centralized or distributed database, and/or associated caches and servers) that store the one or more instructions or data structures. The term "machine-readable medium" shall also be taken to include any tangible medium that is capable of storing, encoding or carrying instructions for execution by the machine and that cause the machine to perform any one or more of the methodologies of the present invention, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., Erasable Programmable Read-Only Memory (EPROM), Electrically Erasable Programmable Read-Only Memory (EEPROM), and flash memory devices; magnetic disks such as internal hard disks and removable disks; magneto-optical disks; and CD-ROM and DVD-ROM disks.

Transmission Medium

The instructions 1924 may further be transmitted or received over a communications network 1926 using a transmission medium. The instructions 1924 may be transmitted using the network interface device 1920 and any one of a number of well-known transfer protocols (e.g., HTTP). Examples of communication networks include a local area network ("LAN"), a wide area network ("WAN"), the Internet, mobile telephone networks, Plain Old Telephone (POTS) networks, and wireless data networks (e.g., WiFi and WiMax networks). The term "transmission medium" shall be taken to include any intangible medium that is capable of storing, encoding or carrying instructions for execution by the machine, and includes digital or analog communications signals or other intangible media to facilitate communication of such software.

Although an embodiment has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A method comprising:

performing a barcode scanning operation on a camera-generated image of a barcode attached to a product item;

identifying a product item according to the barcode;

scanning, via at least one processor, at least one keyword in electronic calendar information and at least one future calendar event in the electronic calendar information, via at least one processor, associated with a user to determine user goal information describing a user goal assigned a target date, the user goal being a health-related goal or a finance-related goal, wherein scanning comprises:

accessing the electronic calendar information associated with the user;

scanning the electronic calendar information for at least one particular keyword that corresponds to the at least one future calendar event identified in the electronic calendar information;

identifying at least one previously-submitted goal of the user;

identifying different user goal information previously submitted by a different user having at least one user attribute similar to at least one user attribute of the user;

determining, based on the at least one particular keyword, the at least one previously-submitted goal of the user and the different user goal information previously submitted by the different user, an inferred user goal associated with the target date that corresponds with the one or more future calendar events; and generating the user goal information based on the inferred user goal;

determining whether procurement of the product item contributes to achieving the user goal; and generating a display, for a user interface of a mobile device of the user, of visual product feedback information indicating whether procurement of the product item contributes achieving the user goal.

2. The method of claim 1, wherein the determining comprises comparing a nutritional value of the product item with a nutritional consumption limit included in the user goal information.

3. The method of claim 1, wherein scanning the at least one keyword in the electronic calendar information and the at least one future calendar event in electronic calendar information associated with the user further comprises:

scanning the electronic calendar information to identify at least one upcoming calendar date identified in the electronic calendar information as one of: a holiday date, a special occasion date or a cheat day date;

determining the user is viewing the product item during one of: the holiday date, the special occasion date, or the cheat day date; and wherein generating a display comprises:
generating the display, via the user interface in the mobile device of the user, of visual product feedback information indicating that procurement of the product item is acceptable.

4. The method of claim 1, further comprising:
determining that procurement of the product item does not contribute to achieving the user goal;
determining a current location of the mobile device of the user;
accessing product directory information identifying one or more product items available at or near the current location;
identifying a substitute product item included in the product directory information that contributes to achieving the user goal; and
providing a suggestion for the substitute product item to the user.

5. The method of claim 4, wherein the current location corresponds to a retail business, and
wherein the product directory information corresponds to a product catalog or product menu associated with the retail business.

6. The method of claim 1, wherein the visual product feedback information corresponds to an icon of a face having any one of a happy expression, an ambivalent expression, a sad expression, and a distressed expression.

7. The method of claim 1, wherein the identifying comprises performing an image recognition operation on a camera-generated image of the product item.

8. A computer-implemented method comprising:
performing a barcode scanning operation on a camera-generated image of a barcode attached to a product item;
identifying a product item according to the barcode;
scanning at least one keyword in electronic calendar information and at least one future calendar event in the electronic calendar information, via at least one processor, associated with a user to determine user goal information describing a user goal assigned a target date, the user goal being a health-related goal or a finance-related goal, wherein scanning comprises:
accessing the electronic calendar information associated with the user;
scanning the electronic calendar information for at least one particular keyword that corresponds to the at least one future calendar event identified in the electronic calendar information;
identifying at least one previously-submitted goal of the user;
identifying different user goal information previously submitted by a different user having at least one user attribute similar to at least one user attribute of the user;
determining, based on the at least one particular keyword, the at least one previously-submitted goal of the user and the different user goal information previously submitted by the different user, an interred user goal associated with the target date that corresponds with the one or more future calendar events; and
generating the user goal information based on the inferred user goal;

determining whether procurement of the product item contributes to achieving the user goal; and
generating a display, for a user interface of a mobile device of the user, of visual product feedback information indicating whether procurement of the product item contributes achieving the user goal, the display including an indicia representing the product item.

9. The computer-implemented method of claim 8, further comprising:
determining a current location of the mobile device of the user;
accessing product directory information identifying available product items that are available at or near the current location;
identifying at least one specific product item from among the available products items that contribute to achieving the user goal; and
updating the display of visual product feedback information to include at least one indicia representing respective specific product items that contribute to achieving the user goal.

10. The computer-implemented method of claim 9, further comprising:
accessing purchase history information or rating information of other users that have goal information similar to the user goal information of the user;
identifying portions of the purchase history information or rating information associated with the current location of the mobile device; and
providing recommendations to the user of the respective specific product items that contribute to achieving the user goal, based on the identified portions of the purchase history information or rating information.

11. The computer-implemented method of claim 9, wherein the visual product feedback information indicates a percentage of the available product items in product directory information that includes the respective specific product item that contributes to achieving the user goal.

12. An apparatus comprising:
an identification module configured to:
perform a barcode scanning operation on a camera-generated image of a barcode attached to a product item;
identify a product item according to the barcode;
scan at least one keyword in electronic calendar information and at least one future calendar event in the electronic calendar information, via at least one processor, associated with the user to determine user goal information describing a user goal assigned a target date, the user goal being a health-related goal or a finance-related goal, which comprises:
the identification module being further configured to:
access the electronic calendar information associated with the user;
scan the electronic calendar information for at least one particular keyword that corresponds to the at least one future calendar event identified in the electronic calendar information;
identify at least one previously-submitted goal of the user;
identify different user goal information previously submitted by a different user having at least one user attribute similar to at least one user attribute of the user;
determine, based on the at least one particular keyword, the at least one previously-submitted goal of the user and the different user goal information previously submitted by the different user, an inferred user goal associated with the target date that corresponds with the one or more future calendar events; and generate the user goal information based on the inferred user goal;

determine whether procurement of the product item contributes to achieving the user goal; and a visual product feedback module configured to generate a display, for a user interface of a mobile device of the user, of visual product feedback information indicating whether procurement of the product item contributes achieving the user goal.

13. The apparatus of claim 12, wherein the identification module determines that procurement of the product item contributes or does not contribute to achieving the user goal, based on a comparison of a nutritional value of the product item with a nutritional consumption limit included in the user goal information.

14. The apparatus of claim 12, wherein the identification module is further configured to:

scan the electronic calendar information to identify at least one upcoming calendar date identified in the electronic calendar information as one of: a holiday date, a special occasion date or a cheat day date;

determine the user is viewing the product item during one of: the holiday date, the special occasion date, or the cheat day date; and the visual product feedback module further configured to:

generate the display, via the user interface in the mobile device of the user, of visual product feedback information indicating that procurement of the product item is acceptable.

\* \* \* \* \*